(12) United States Patent
Takagi

(10) Patent No.: US 8,848,355 B2
(45) Date of Patent: Sep. 30, 2014

(54) COMMUNICATION DEVICE AND METHOD FOR COMBINING AND SEPARATING HOUSINGS

(75) Inventor: Hisamitsu Takagi, Inagi (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 13/240,669

(22) Filed: Sep. 22, 2011

(65) Prior Publication Data
US 2012/0081846 A1 Apr. 5, 2012

(30) Foreign Application Priority Data

Sep. 30, 2010 (JP) .................................. 2010-222581

(51) Int. Cl.
*H04M 1/00* (2006.01)
*H04M 1/02* (2006.01)
(52) U.S. Cl.
CPC .......... *H04M 1/0237* (2013.01); *H04M 1/0256* (2013.01)
USPC ............... 361/679.29; 379/433.12; 455/575.4

(58) Field of Classification Search
USPC ............... 361/679.29; 379/433.12; 455/575.4
See application file for complete search history.

(56) References Cited

U.S. PATENT DOCUMENTS

2010/0317416 A1* 12/2010 Tomohara et al. ......... 455/575.4

FOREIGN PATENT DOCUMENTS

| JP | 2002-176478 | 6/2002 |
| JP | 2003-348204 | 12/2003 |

* cited by examiner

*Primary Examiner* — Ramon Barrera
(74) *Attorney, Agent, or Firm* — Greer Burns & Crain Ltd.

(57) ABSTRACT

There is provided a communication device that includes a first housing with a rail and a slider, the rail and the slider being capable of engaging with each other, and a second housing including a hook which engages with the slider to combine the first and the second housings each other when the first housing is slid above the second housing along a first direction, the hook being disengaged with the slider to release the first housing from the second housing according to an operation including a motion in which the first housing is slid above the second housing along a second direction different from the first direction.

12 Claims, 18 Drawing Sheets

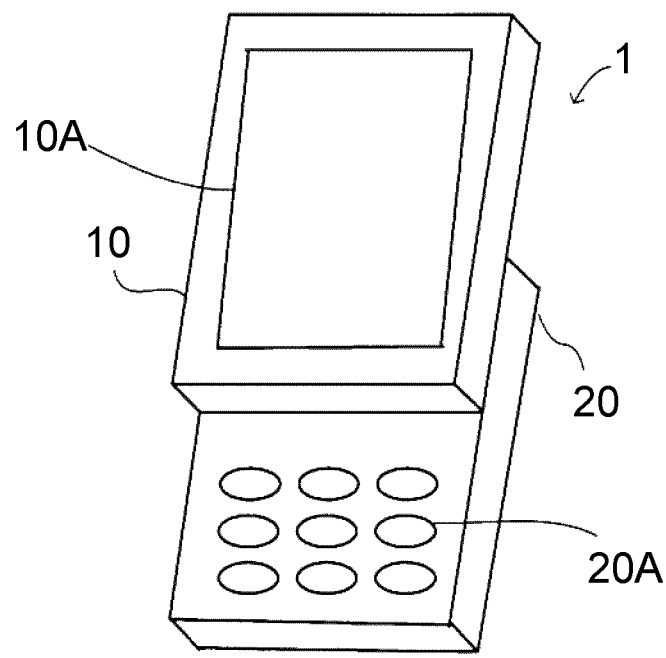
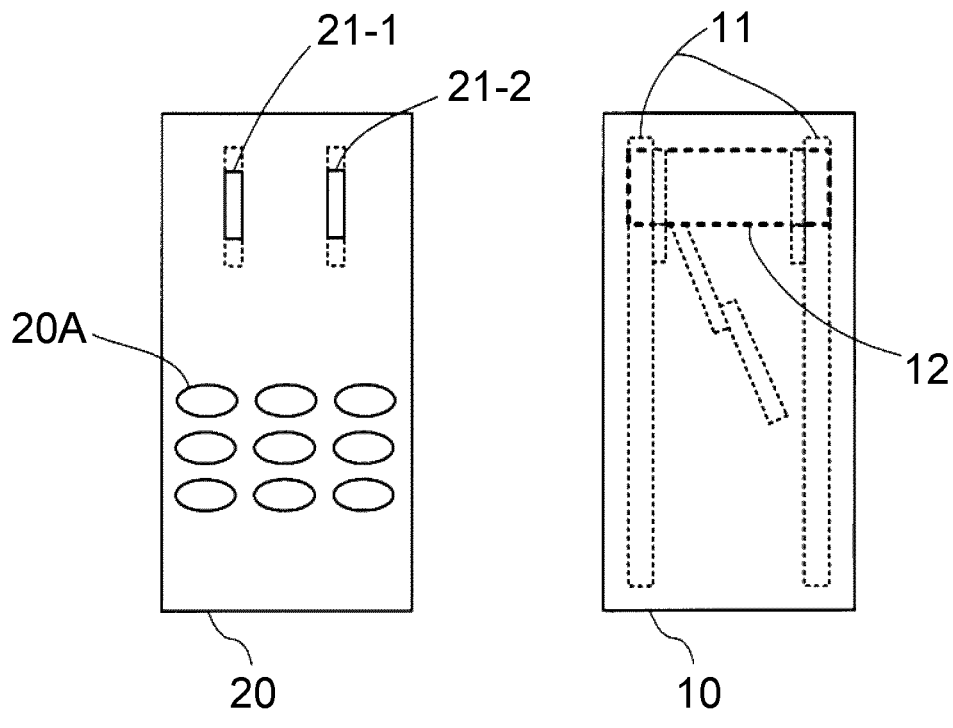
FIG. 1A
FIG. 1B     FIG. 1C

FACE OF SLIDE

COMMUNICATION DEVICE AND METHOD FOR COMBINING AND SEPARATING HOUSINGS

CROSS-REFERENCE TO RELATED APPLICATION

This application is based upon and claims the benefit of priority of the prior Japanese Patent Application No. 2010-222581, filed on Sep. 30, 2010, the entire contents of which are incorporated herein by reference.

FIELD

The present embodiments relate to a communication device for information communication and a method of combining and releasing housings which include electronic elements.

BACKGROUND

A separable type mobile phone, including two housings capable of being combined with each other and released from each other, have recently been developed. One of the housings is a display unit and the other housing is a keypad unit. A typical separable type mobile phone is able to establish communication connection between the display and the keypad units by use of communication based on to a short-range wireless standard, such as Bluetooth (registered trademark). The two housings may be slidable over each other while the two housings are combined with each other.

Since the display unit and the keypad unit may be used in a manner that these units are released from each other, a user may use these units in a free arrangement. For example, a user may browse a website on the display unit while talking on the phone through the keypad unit. Such a mobile phone is attracting attention as a new mobile phone model capable of providing a variety of services.

Slidable type mobile phones having a magnetic coupling function are disclosed in, for example, Japanese Laid-open Patent Publication Nos. 2002-176478 and 2003-348204.

SUMMARY

According to an aspect of the invention, a communication device includes a first housing including a rail and a slider, the rail and the slider being capable of engaging with each other, and a second housing including a hook which engages with the slider to combine the first and the second housings each other when the first housing is slid above the second housing along a first direction, the hook being disengaged with the slider to release the first housing from the second housing according to an operation including a motion in which the first housing is slid above the second housing along a second direction different from the first direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1A to 1C are diagrams illustrating an exemplary configuration of a communication device;

DESCRIPTION OF EMBODIMENTS

[Preliminary Consideration]

Figure 2:
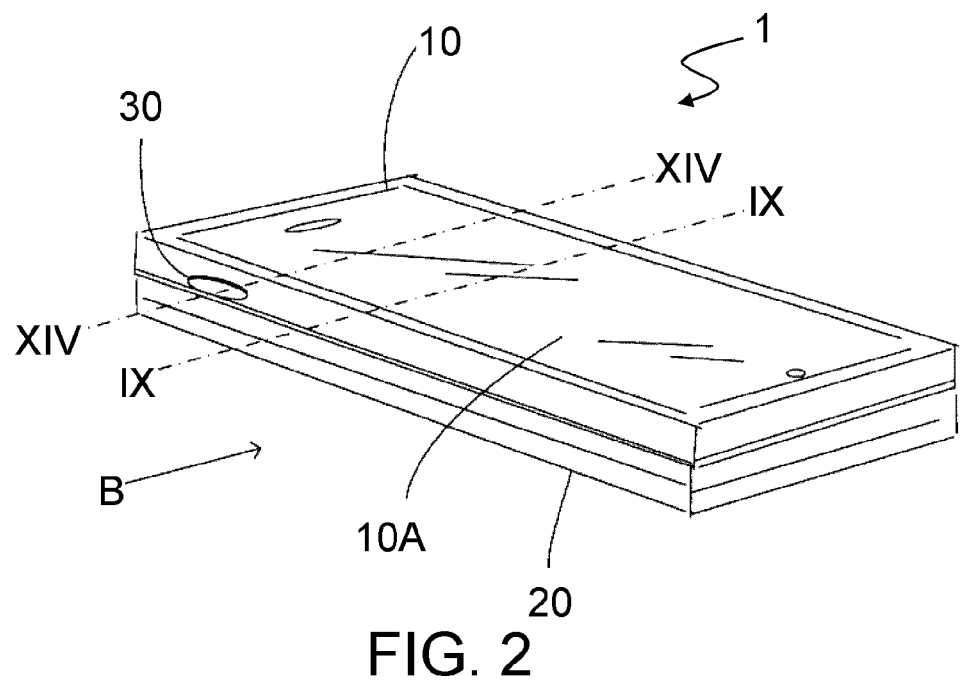
FIG. 2 is a diagram illustrating the communication device in its slide closed state.

The separable type mobile phone described in the background, however, the display and the keypad units is easily disconnected from each other, for example, in sliding operation. Disadvantageously, the ease of operation is not good.

The present embodiments have been made in consideration of the above-described disadvantage. Accordingly, it is an object in one aspect of the embodiment to provide a communication device with an improved mechanism for ease of operation when combining and releasing the housings.

Another object in an other aspect of the embodiment is to provide a method of combining and releasing the housings with improved operability of combining and releasing the housings.

[Embodiments]

An embodiment of the present invention will be described below with reference to the drawings. FIGS. 1A to 1C illustrate an exemplary configuration of a communication device. The communication device 1 includes an upper housing 10 including electronic elements, corresponding to a first housing, and a lower housing 20 including electronic elements, corresponding to a second housing such that the upper housing 10 may be combined with and released from the lower housing 20.

The upper housing 10 and the lower housing 20 each have an independent communication function. Accordingly, for example, while the housings 10 and 20 are combined with each other, the communication device 1 functions as a normal mobile phone. While the housings 10 and 20 are separated from each other, for example, a user may use the Internet through the upper housing 10 and talk on the phone through the lower housing 20. The upper housing 10 and the lower housing 20 may communicate with other terminals separately and may also communicate with each other.

The upper housing 10 includes, for example, a display unit 10A on the front surface (hereinafter, also referred to as a "display surface") thereof. On the rear surface of the upper housing 10, the housing 10 includes a rail 11 and a sliding member 12 as illustrated in FIG. 1C. The sliding member 12 is engaged with the rail 11 and is slid thereon.

The lower housing 20 includes, for example, a keypad unit 20A on the front surface (hereinafter, also referred to as a "keypad surface"). As illustrated in FIG. 1B, the lower housing 20 further includes, in upper part of the front surface, hooks 21-1 and 21-2 which are engaged with the sliding member 12 to combine the lower housing 20 with the upper housing 10.

When an operation is performed such that the upper housing 10 is brought into contact with the lower housing 20 and is slid in one direction relative to the lower housing 20, the hooks 21-1 and 21-2 are engaged with the sliding member 12, so that the upper housing 10 is combined with the lower housing 20.

When an operation is performed such that the upper housing 10 is slid in the other direction relative to the lower housing 20, the hooks 21-1 and 21-2 are disengaged from the sliding member 12, so that the upper housing 10 is separated from the lower housing 20.

An exemplary appearance of the communication device 1 will now be described. FIG. 2 illustrates the communication device 1 in its slide-closed state. In this slide-closed state, the lower housing 20, serving as a fixed housing, is combined with the upper housing 10, serving as a housing movable relative to the lower housing 20.

The front surface of the upper housing 10 is provided with the display unit 10A, such as a liquid crystal display (LCD). A side surface of the upper housing 10 is provided with a separation button 30 which is pushed to separate the upper housing 10 from the lower housing 20. The function of the separation button 30 will be described in detail below.

Figure 3:
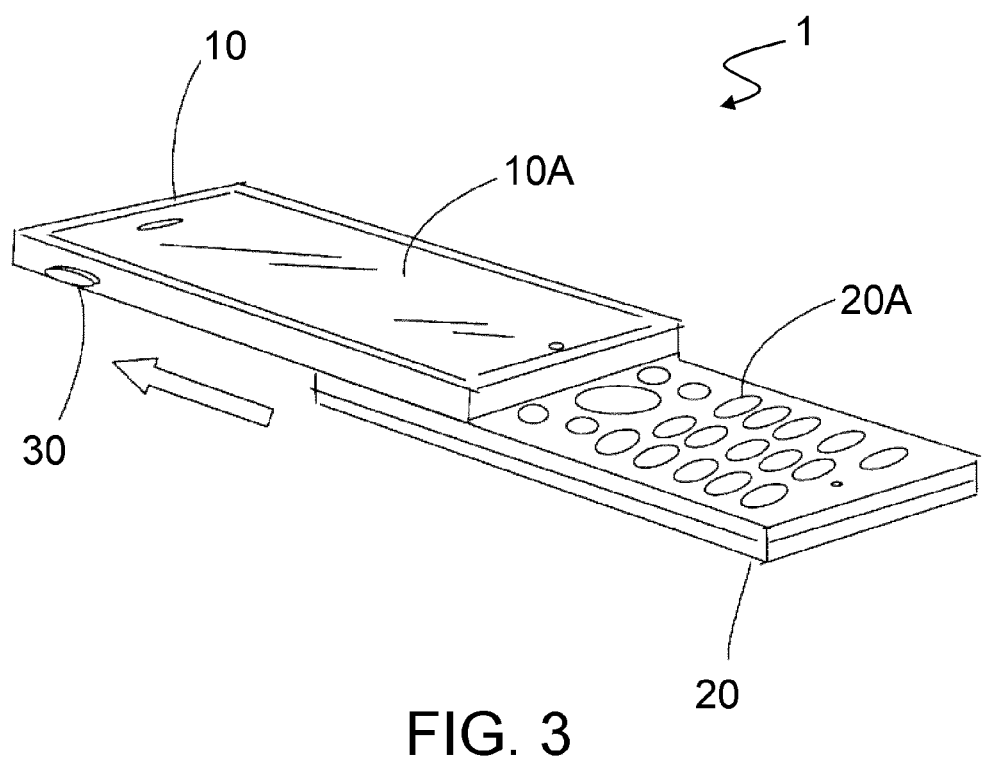
FIG. 3 is a diagram illustrating the communication device in its slide open state.

FIG. 3 illustrates the communication device 1 in its slide open state. In this state, the upper housing 10 is slid relative to the lower housing 20. When the upper housing 10 is slid upward relative to the lower housing 20, the keypad unit 20A provided for the lower housing 20 is revealed.

Figure 4:
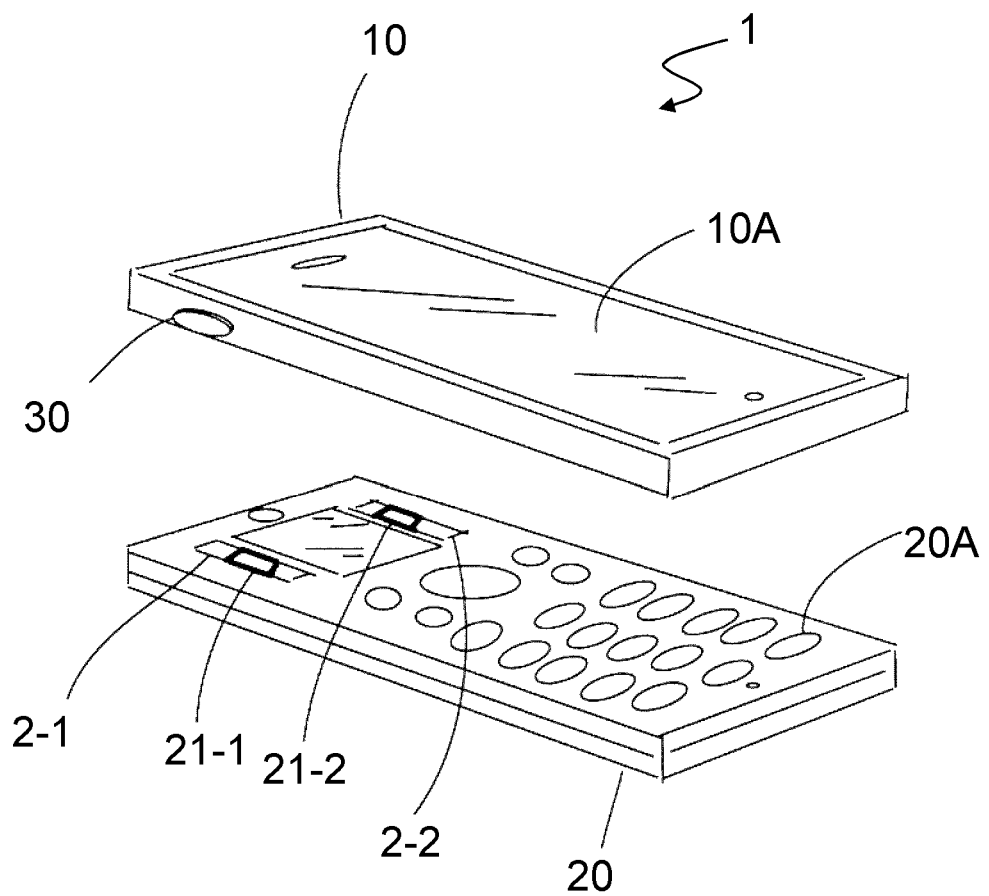
FIG. 4 is a diagram illustrating the communication device in its separated state.

FIG. 4 illustrates the communication device 1 in its separated state or released state. In this state, the upper housing 10 is separated from the lower housing 20. The lower housing 20 includes two hook storage portions 2-1 and 2-2 arranged in upper part of the front surface thereof. The hook storage portions 2-1 and 2-2 store the hooks 21-1 and 21-2, respectively. To combine the lower housing 20 with the upper housing 10, the hooks 21-1 and 21-2 protrude out of the hook storage portions 2-1 and 2-2, respectively, to combine the lower housing 20 with the upper housing 10.

While the upper housing 10 is separated from the lower housing 20, the hooks 21-1 and 21-2 are respectively received in the hook storage portions 2-1 and 2-2 at all times. For example, if the keypad surface of the lower housing 20 faces downward, the hooks 21-1 and 21-2 do not protrude out of the hook storage portions 2-1 and 2-2. The hook storage will be described later.

Figure 5:
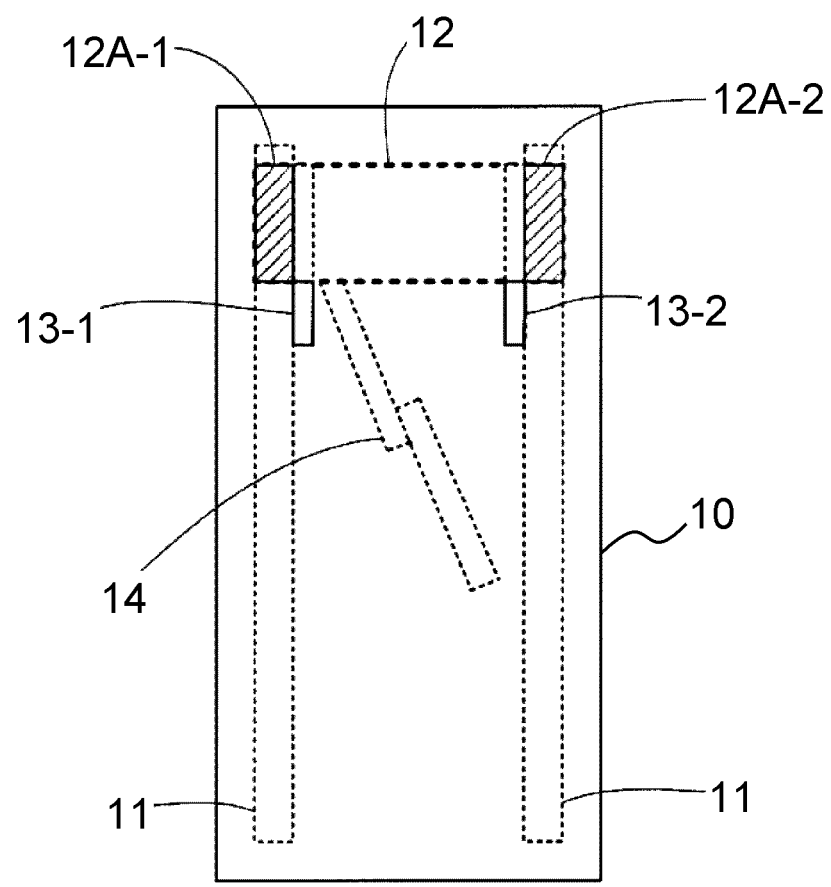
FIG. 5 is a diagram illustrating the internal structure of an upper housing as viewed from the rear surface thereof.

A slide mechanism provided for the upper housing 10 will now be described. FIG. 5 illustrates the internal structure of the upper housing 10A viewed from the rear surface thereof where the display unit 10A of the upper housing 10 is not disposed.

The upper housing 10 is provided with the rail 11, the sliding member 12, slide lubricating members 12A-1 and 12A-2, hook attraction magnets 13-1 and 13-2, and a slide assist spring (guitar spring) 14.

The slide lubricating members 12A-1 and 12A-2 are attached to both ends of the sliding member 12. The sliding member 12 is engaged with the rails 11 through the slide lubricating members 12A-1 and 12A-2.

One end of the slide assist spring 14 is connected to the sliding member 12 and the other end thereof is connected to the rear surface of the upper housing 10, such that the sliding member 12 is held by the slide assist spring 14. The upper housing 10 is further provided with the hook attraction magnets 13-1 and 13-2 configured to attract the above-described hooks 21-1 and 21-2 provided for the lower housing 20 when the housings are combined with each other.

Figure 6:
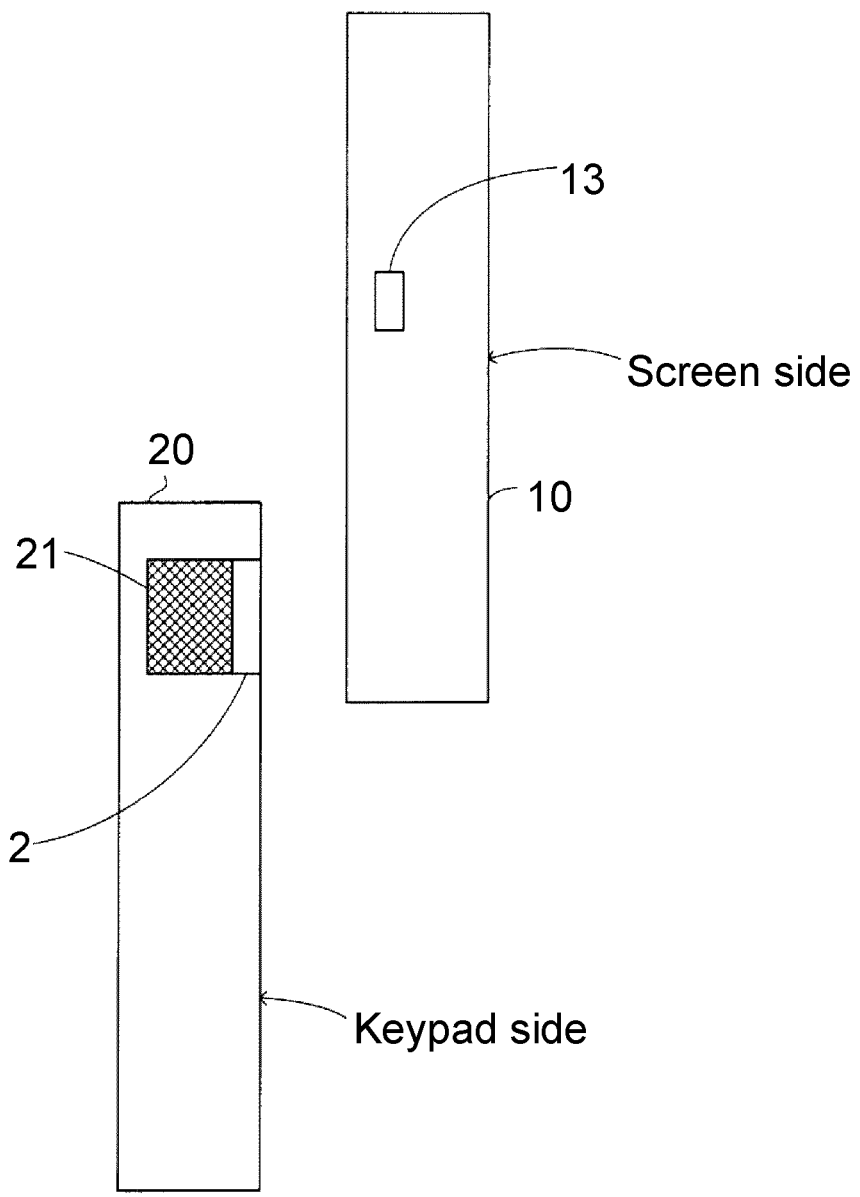
FIG. 6 is a diagram illustrating a sliding operation for combining the upper housing with a lower housing.
Figure 7:
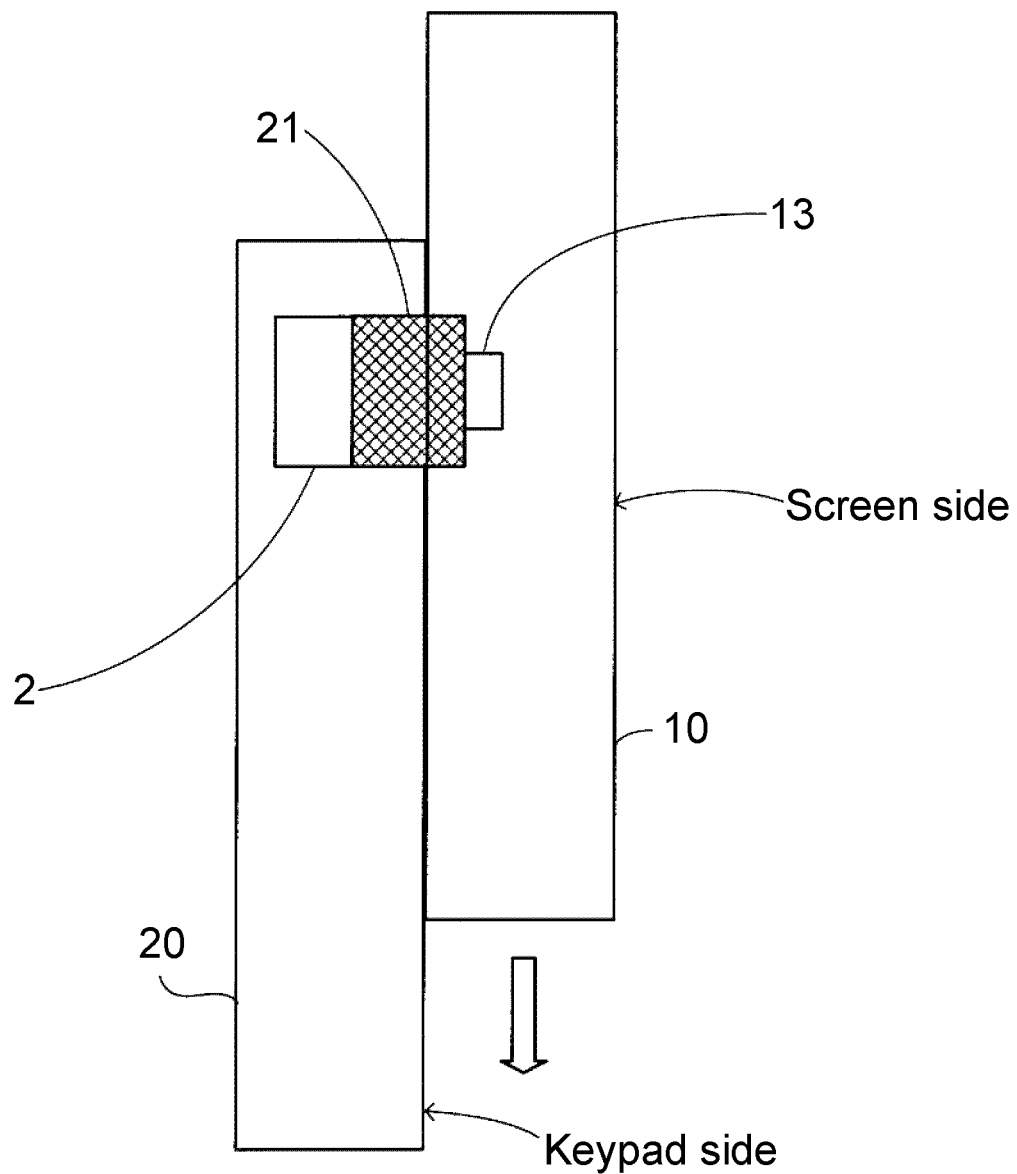
FIG. 7 is a diagram illustrating the sliding operation for combining the upper housing with the lower housing.
Figure 8:
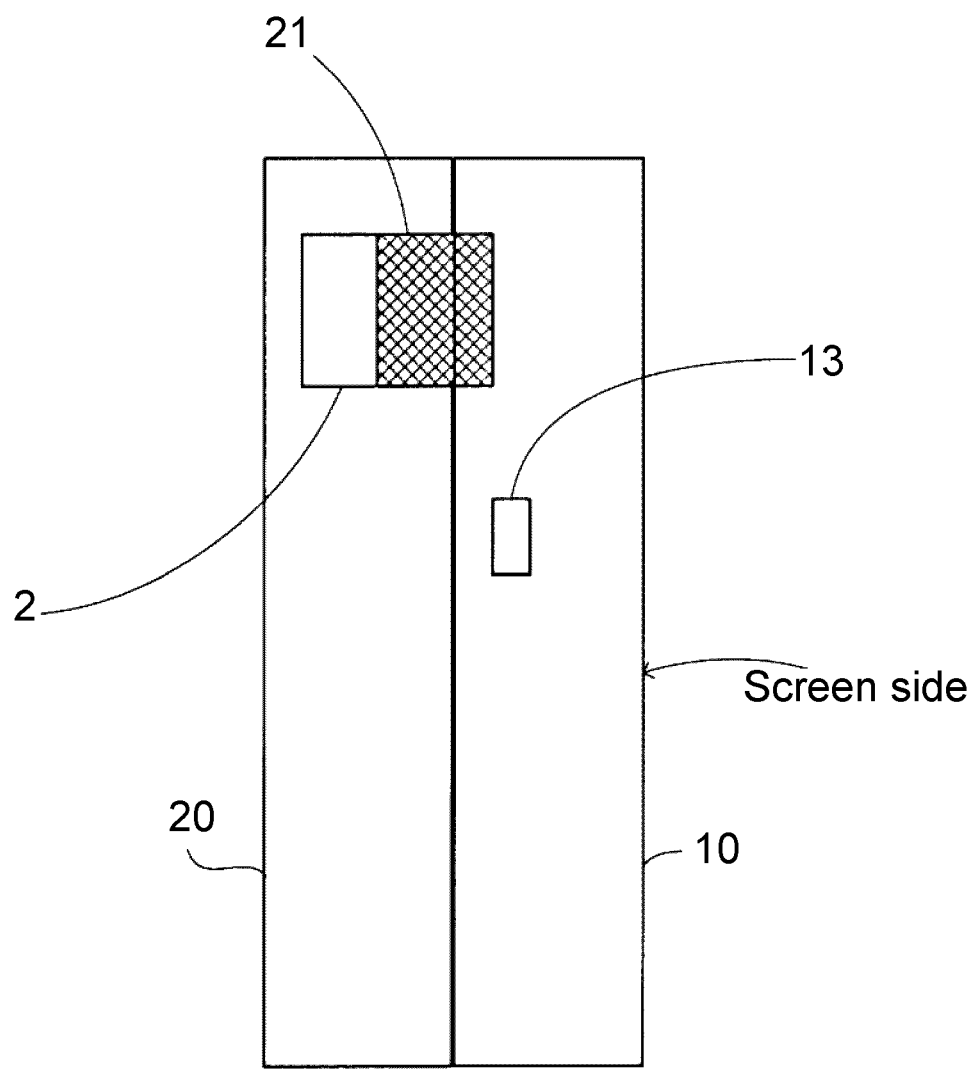
FIG. 8 is a diagram illustrating the sliding operation for combining the upper housing with the lower housing.

A sliding operation performed to combine the upper housing 10 with the lower housing 20 will now be described. FIGS. 6 to 8 are diagrams, from a lateral view, illustrating the sliding operation for combining the upper housing 10 with the lower housing 20. FIG. 6 illustrates a state where the upper housing 10 is separated from the lower housing 20. At this time, each hook 21 is received in the corresponding hook storage portion 2 in the lower housing 20.

FIG. 7 illustrates a state where the upper housing 10 is slid downward while the rear surface of the upper housing 10 is in contact with the front surface (keypad side) of the lower housing 20. Each hook storage portion 2 in the lower housing 20 is positioned under the corresponding hook attraction magnet 13 provided for the upper housing 10 and the hook 21 is drawn from the hook storage portion 2.

To combine the upper housing 10 with the lower housing 20, these housings are aligned for combination and the upper housing 10 is slid downward relative to the lower housing 20. At this time, the hook 21 received in the hook storage portion 2 is drawn by magnetic force of the hook attraction magnet 13.

FIG. 8 illustrates a state where the upper housing 10 is combined with the lower housing 20. The hook 21 drawn by the magnetic force of the hook attraction magnet 13 is engaged with the sliding member 12 in the upper housing 10 as the upper housing 10 is slid in a direction indicated by the arrow in FIG. 7 relative to the lower housing 20, so that the upper housing 10 is combined with the lower housing 20. The combination will be described in detail later.

The sliding member 12 is slidable upward and downward on the rail 11. The sliding operation, described above with reference to FIG. 3, performed while the upper housing 10 is combined with the lower housing 20 allows the upper housing 10 to be slid relative to the lower housing 20 while being combined with the lower housing 20 and being held in a range where the slide assist spring 14 is movable.

Figure 9:
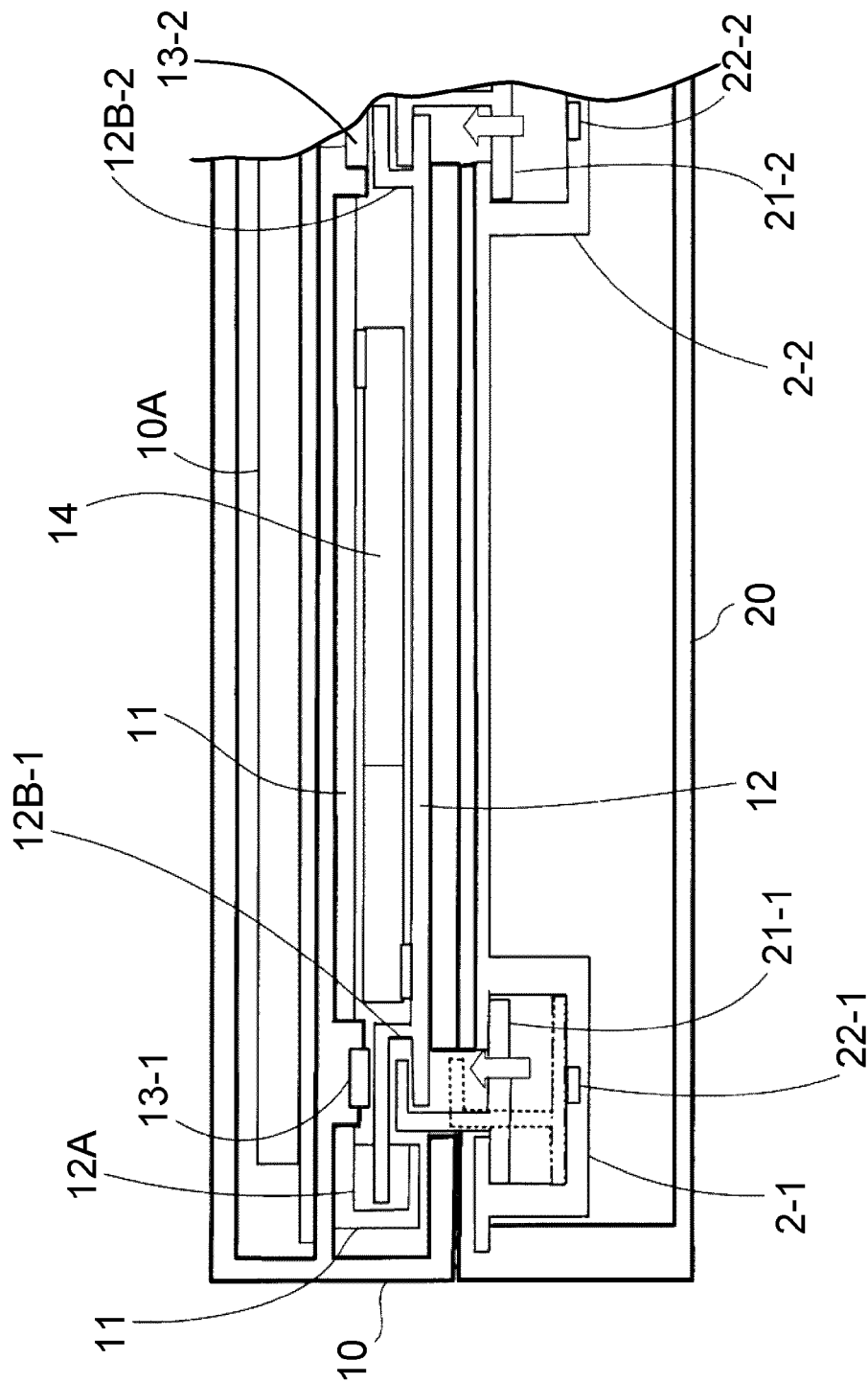
FIG. 9 is a diagram illustrating the internal structures of the upper and lower housings while being combined with each other.

The combination of the upper housing 10 and the lower housing 20 will now be described. FIG. 9 illustrates the internal structures of the upper housing 10 and the lower housing 20 while being combined with each other. FIG. 9 is a cross-sectional view of the housings taken along the line IX-IX in FIG. 2 and illustrates a state where the hooks 21-1 and 21-2 are attracted to the respective magnets provided for the upper housing 10.

The lower housing 20 includes the hook storage portions 2-1 and 2-2. The hooks 21-1 and 21-2 are received in the hook storage portions 2-1 and 2-2, respectively. The hook storage portions 2-1 and 2-2 are spaces for enclosing the hooks 21-1 and 21-2 in the lower housing 20 when the housings are separated from each other. The bottom surfaces of the hook storage portions 2-1 and 2-2 are provided with hook storage magnets 22-1 and 22-2, respectively.

The hook storage magnets 22-1 and 22-2 are magnets having a low magnetic force for receiving the hooks 21-1 and 21-2 in the hook storage portions 2-1 and 2-2, respectively. The hook storage magnets 22-1 and 22-2 prevent the hooks 21-1 and 21-2 from easily protruding out of the hook storage portions 2-1 and 2-2 under their own weights when the housings are separated or released from each other. Furthermore, since the protrusions used for combining the housings do not appear in the lower housing 20 upon separation of the housings, the appearance of the housing is not degraded.

The upper housing 10 has a two-layer structure. A first layer receives the display unit 10A. A second layer receives mechanical components for combination and separation of the housings, e.g., the rail 11, the sliding member 12, the slide lubricating members 12A, the hook attraction magnets 13-1 and 13-2, the slide assist spring 14, and et al.

The sliding member 12 is engaged with the rail 11 through the slide lubricating members 12A. The engagement of the sliding member 12 with the rail 11 through the slide lubricating members 12A reduces frictional resistance between the sliding member 12 and the rail 11, thus allowing smooth sliding.

The slide lubricating members 12A may be shaped in preferable form because the members are made of, for example, chemical resin. Accordingly, when the slide lubricating members 12A are processed into such a shape that the clearance between the sliding member 12 and the rail 11 is reduced and the resultant slide lubricating members 12A are arranged, the play between the sliding member 12 and the rail 11 may be reduced.

The hook attraction magnets 13-1 and 13-2, serving as magnets for attracting the hooks 21-1 and 21-2, have a magnetic force higher than that of the hook storage magnets 22-1 and 22-2.

When the hook attraction magnets 13-1 and 13-2 approach the hooks 21-1 and 21-2, the hooks 21-1 and 21-2 received in the hook storage portions 2-1 and 2-2 are drawn therefrom.

The sliding member 12 is further provided with hook catch recesses 12B-1 and 12B-2 for catching the hooks 21-1 and 21-2, respectively. The hooks 21-1 and 21-2 pulled upward by the magnetic force of the hook attraction magnets 13-1 and 13-2 are caught by the hook catch recesses 12B-1 and 12B-2, respectively.

As described above, since the hook attraction magnets 13-1 and 13-2 having a magnetic force higher than that of the hook storage magnets 22-1 and 22-2 are provided for the upper housing 10, the hooks 21-1 and 21-2 may be drawn by a simple operation when the housings are combined with each other. Thus, ease of operation for a user may be improved.

A lock mechanism between the sliding member 12 and the hooks 21-1 and 21-2 will now be described. When the upper housing 10 is combined with the lower housing 20, the hooks 21-1 and 21-2 are drawn from the lower housing 20 and are engaged with the hook catch recesses 12B-1 and 12B-2, respectively, so that the hooks 21-1 and 21-2 are connected to the sliding member 12. In this state, however, the hooks 21-1 and 21-2 are not completely secured to the sliding member 12 because the hooks 21-1 and 21-2 are hung on the sliding member 12.

A lock mechanism is therefore provided which allows the upper housing 10 to be slid relative to the lower housing 20 from a position, where the hooks 21-1 and 21-2 are engaged with the hook catch recesses 12B-1 and 12B-2 such that the hooks are hung on the sliding member 12, to lock the sliding member 12.

For example, the lock mechanism is provided which allows the upper housing 10 to be slid up to a position, where the leading end of the upper housing 10 is aligned with that of the lower housing 20 such that the leading ends are flush with each other, to lock the hook 21-1 to the sliding member 12.

Figure 10:
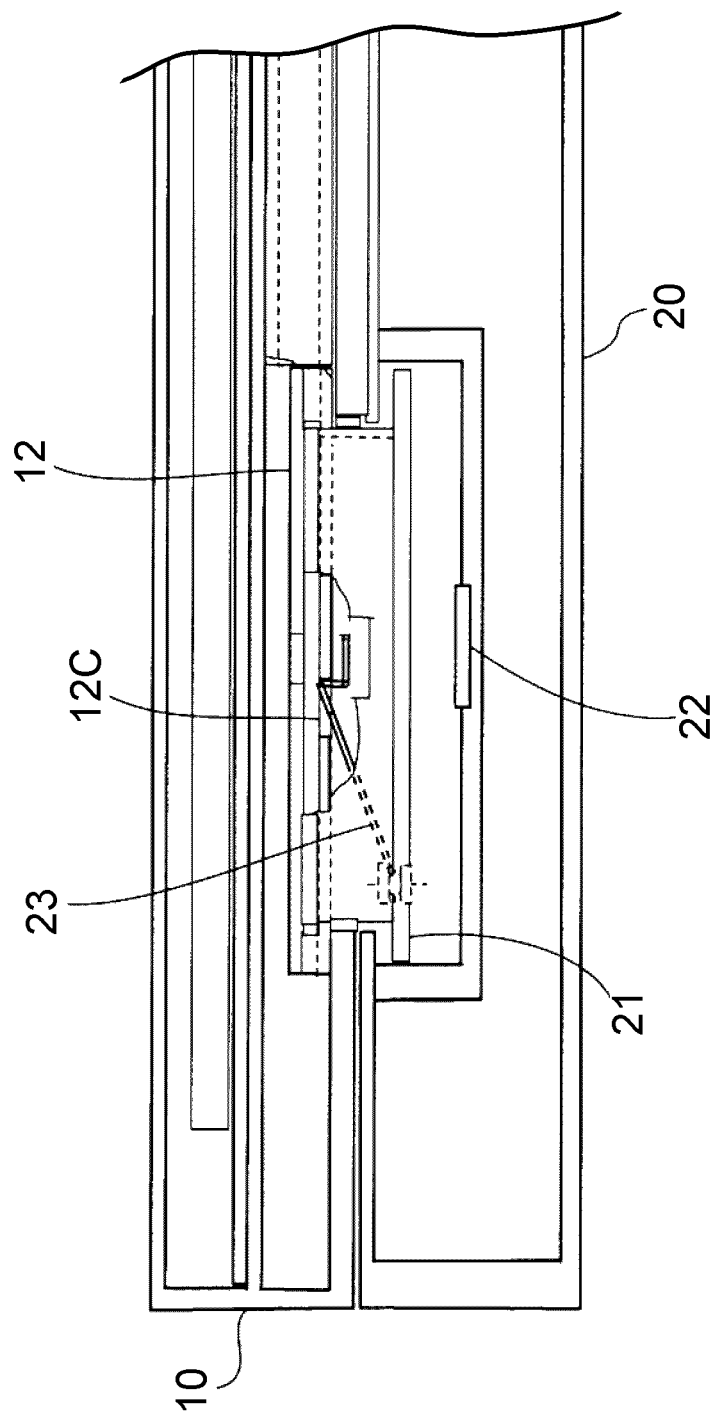
FIG. 10 is a diagram illustrating a lock mechanism.

FIG. 10 illustrates the lock mechanism and illustrates the internal structures of the housings as viewed in the direction of the arrow B in FIG. 2. In FIG. 10, the separation button 30 is not illustrated. The hook 21 is provided with a lock spring 23. The sliding member 12 has a lock groove 12C.

While the hook 21 is engaged with the hook catch recess such that the hook is hung on the sliding member 12, the upper housing 10 is further slid relative to the lower housing 20. Consequently, the lock spring 23 attached to the hook 21 is engaged with the lock groove 12C in the sliding member 12. Thus, the hook 12 is completely secured to the sliding member 12.

Figure 11:
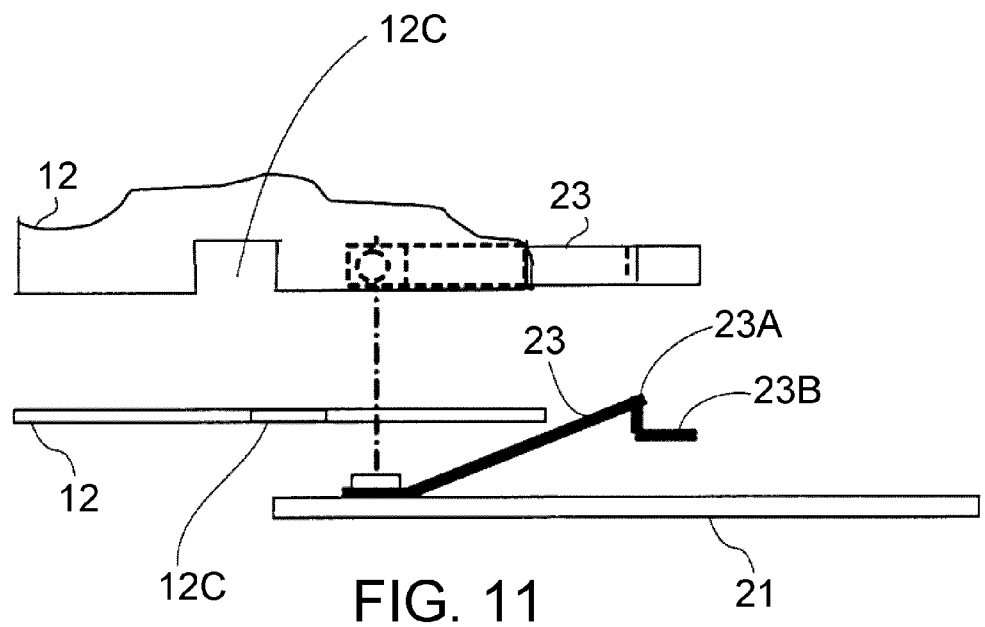
FIG. 11 is a diagram illustrating state transition until a hook and a sliding member are locked.
Figure 12:
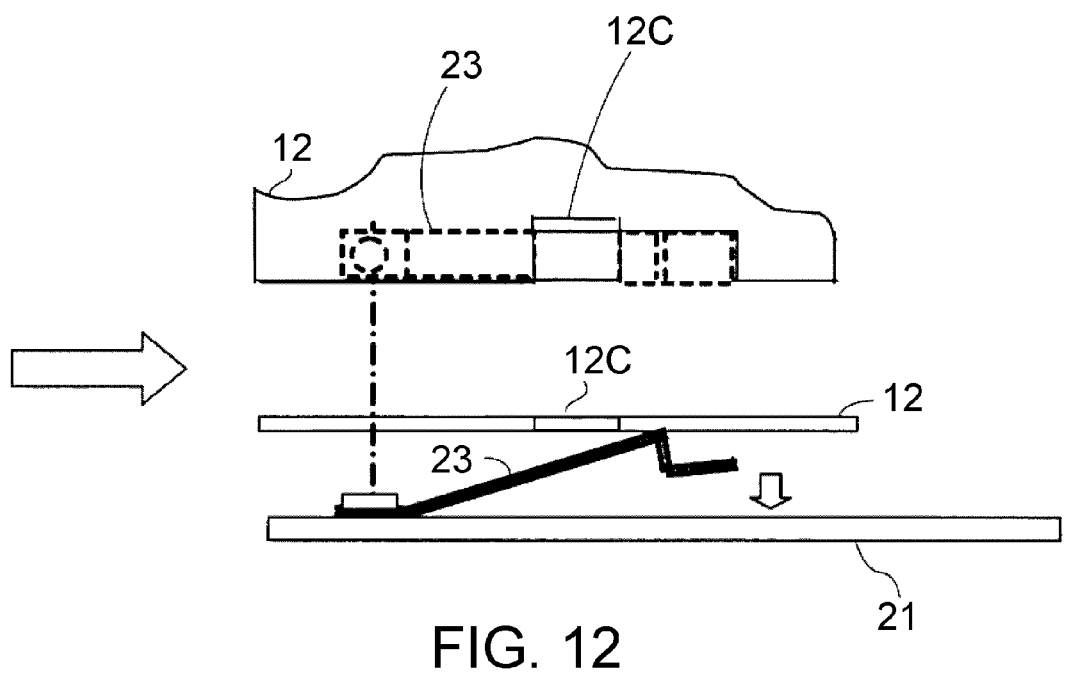
FIG. 12 is a diagram illustrating state transition until the hook and the sliding member are locked.
Figure 13:
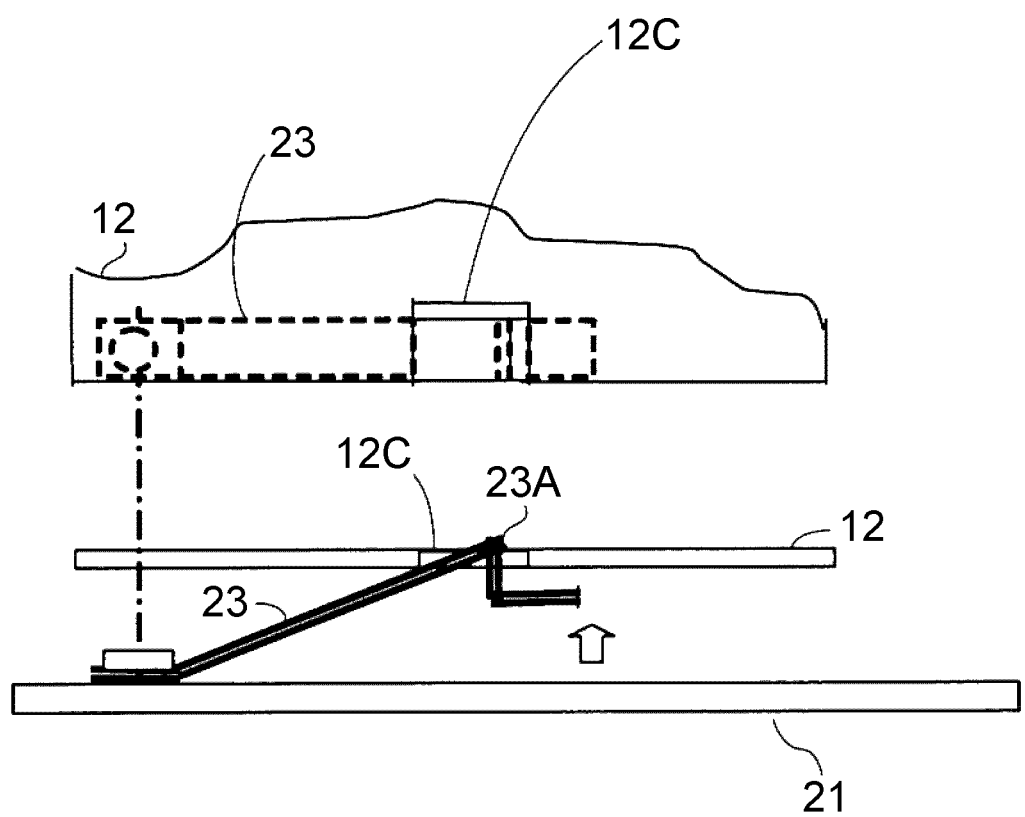
FIG. 13 is a diagram illustrating state transition until the hook and the sliding member are locked.

FIGS. 11 to 13 illustrate state transition until the hook 21 and the sliding member 12 are locked. The lock spring 23 is attached to the upper surface of the hook 21. The sliding member 12 has a notch, serving as the lock groove 12C. The lock spring 23 includes a projection 23A and an arm 23B. The function of the arm 23B will be described later.

FIG. 11 illustrates a state before the hook 21 and the sliding member 12 are locked. FIG. 12 illustrates a state where the lock spring 23 is moved downward. When the sliding member 12 is slid in the direction indicated by the arrow, the sliding member 12 is brought into contact with an inclined surface of the lock spring 23 to press the lock spring 23, so that the lock spring 23 is moved downward.

FIG. 13 illustrates a state where the sliding member 12 is locked by the lock spring 23. When the sliding member 12 is further slid from the state illustrated in FIG. 12, the projection 23A of the lock spring 23 is engaged with the lock groove 12C, so that the lock spring 23 is moved upward to lock the sliding member 12.

As described above, the hook 21 is provided with the lock spring 23 and the sliding member 12 has the lock groove 12C. This lock mechanism is designed such that when the upper housing 10 is slid relative to the lower housing 20 in the sliding operation for combining the housings, the lock spring 23 is engaged with the lock groove 12C to secure the hook to the sliding member 12. Accordingly, the upper housing 10 may be securely combined with the lower housing 20 by a simple operation upon combination of the housings, thus increasing the ease of operation for the user.

The separation button 30 will now be described. To separate the combined upper and lower housings 10 and 20, the separation button 30 disposed on the side surface of the upper housing 10 is pushed. Thus, the combined housings may be separated from each other.

Figure 14:
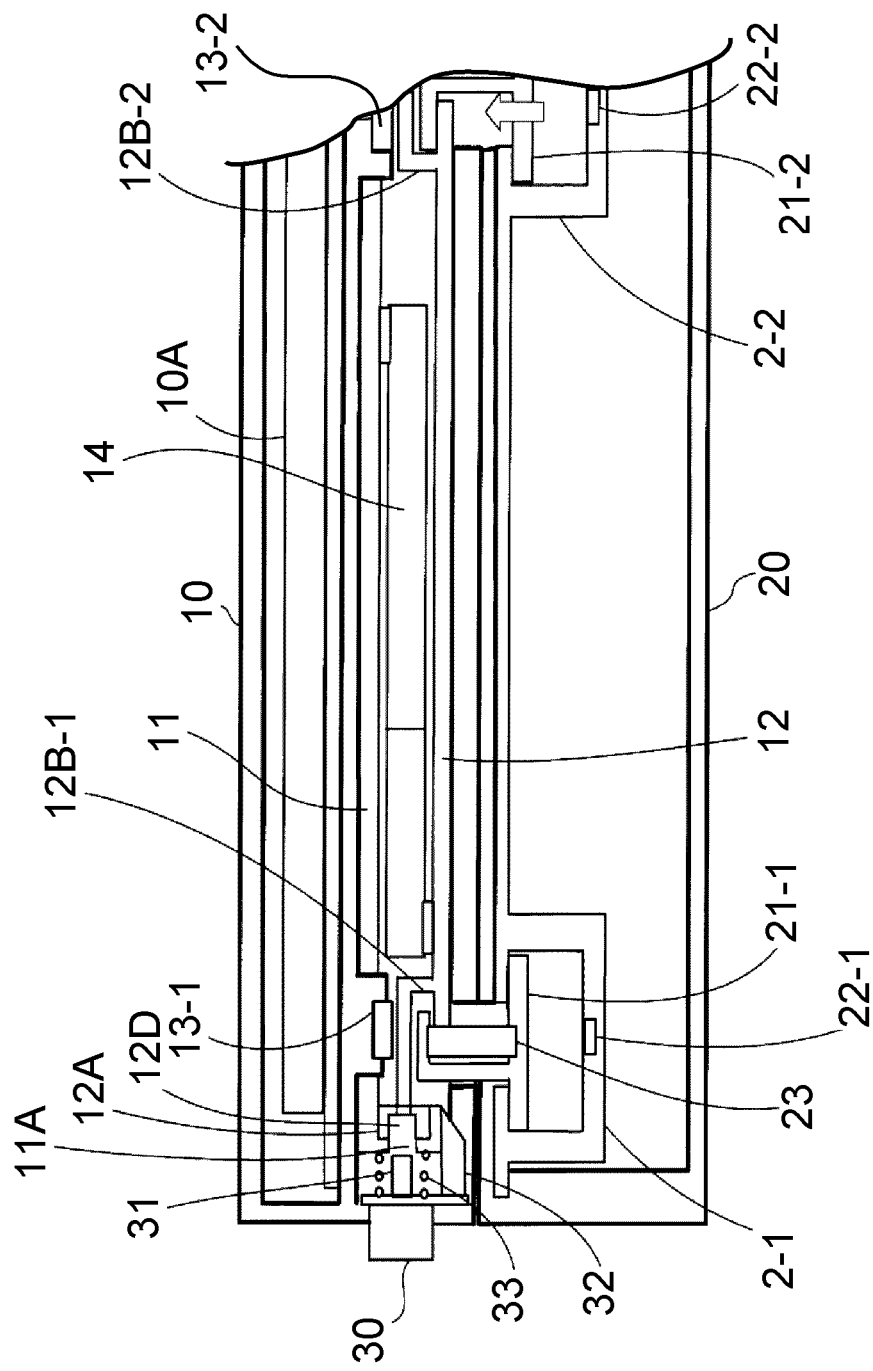
FIG. 14 is a diagram explaining a separation button.
Figure 15:
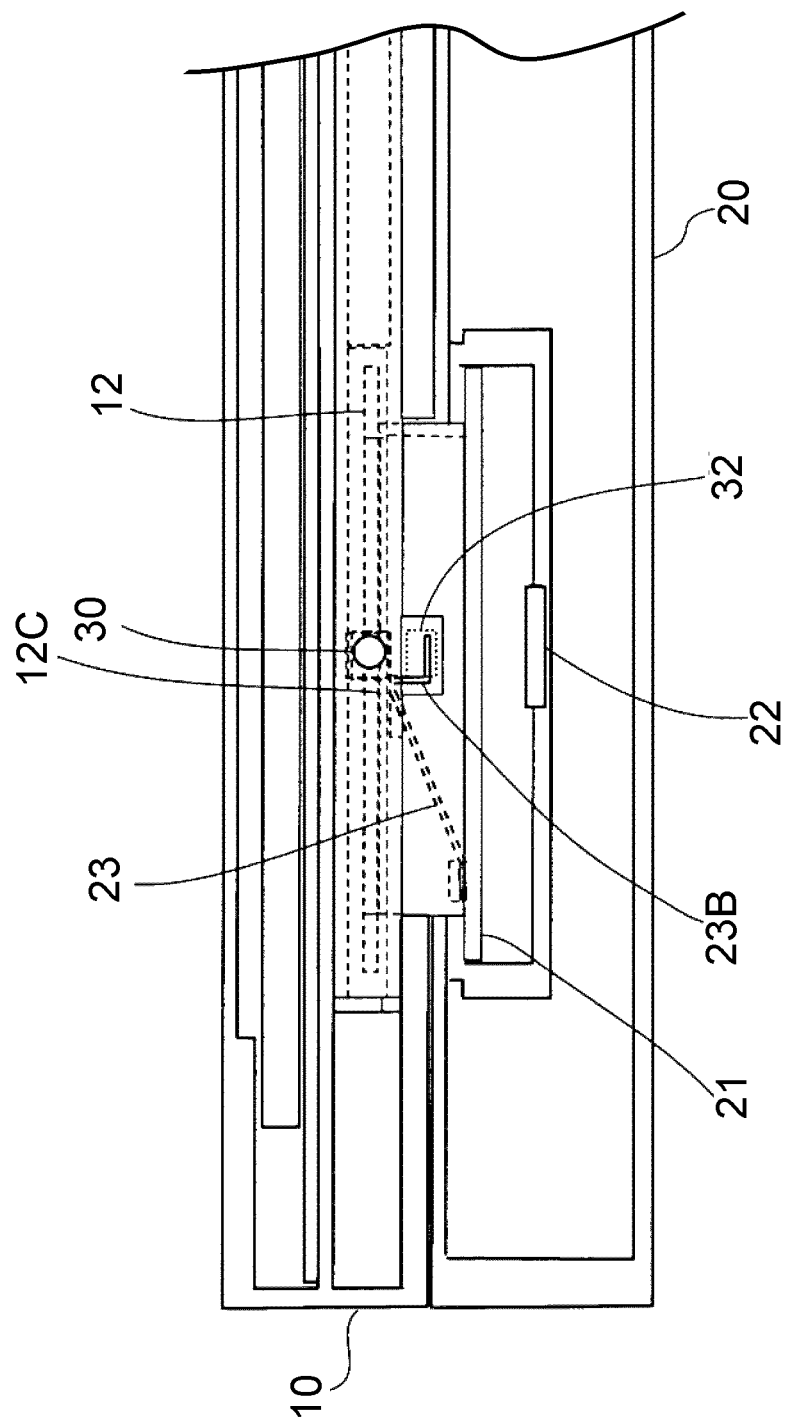
FIG. 15 is a diagram explaining the separation button.

FIGS. 14 and 15 are diagrams explaining the separation button 30. FIG. 14 is a cross-sectional view of the housings taken along the line XIV-XIV in FIG. 2. FIG. 15 illustrates the internal structures of the housings as viewed in the direction of the arrow B in FIG. 2. Explanation of the components described above with reference to FIG. 9 is omitted.

The upper housing 10 is provided with the separation button 30 on the side surface thereof. The separation button 30 includes two protrusions, i.e., a slide fixing protrusion (first protrusion) 31 and an unlocking protrusion (second protrusion) 32.

The slide fixing protrusion 31 will now be described. If the upper housing 10 is slid relative to the lower housing 20 so that the upper housing 10 is disengaged from the hooks 21-1 and 21-2, the sliding member 12 is moved while being engaged with the hooks 21-1 and 21-2. Accordingly, the sliding member 12 is not disengaged from the hooks 21-1 and 21-2 in this state. To disengage the sliding member 12 from the hooks 21-1 and 21-2, therefore, the sliding member 12 has to be fixed to the upper housing 10.

The rail 11 has a through-hole 11A. The slide-lubricating member 12A has a protrusion receiving recess 12D. When the separation button 30 is pushed, the slide fixing protrusion 31 extends through the through-hole 11A of the rail 11 and is fitted into the protrusion receiving recess 12D.

When the slide fixing protrusion 31 is fitted into the protrusion, receiving recess 12D in this manner, the sliding member 12 secured to the slide-lubricating member 12A is fixed to the upper housing 10.

The unlocking protrusion 32 will now be described. The lock spring 23 is used to lock the hook 21 so that the hook hung on the sliding member 12 is not disengaged from the sliding member 12 during the sliding operation. To separate the upper housing 10 from the lower housing 20, therefore, this lock has to be unlocked after the sliding member 12 is fixed to the upper housing 10.

The lock spring 23 includes the arm 23B as illustrated in FIG. 11. When the separation button 30 is pushed, an inclined surface of the unlocking protrusion 32 is brought into contact with the arm 23B of the lock spring 23 to move the lock spring 23 downward.

Consequently, the projection 23A of the lock spring 23 is disengaged from the lock groove 12C of the sliding member 12, thus unlocking the sliding member 12 from the lock spring 23. The separation button 30 is provided with a coil spring 33. When the separation button 30 is pushed and is then released, the separation button 30 is returned to its original position by restoring force of the coil spring 33.

As described above, the slide fixing protrusion 31 fixes the sliding member 12 to the upper housing 10 and the unlocking protrusion 32 unlocks the lock between the sliding member 12 and the hook 21. Thus, when the upper housing 10 is slid so that the upper housing 10 is disengaged from the hooks 21, the hooks may be disengaged from the sliding member 12.

As described above, the separation button 30 is provided with the slide fixing protrusion 31 and the unlocking protrusion 32 to allow the above-described two operations for separation of the upper housing 10 and the lower housing 20. Accordingly, pushing the single separation button 30 allows the upper housing 10 to be easily separated from the lower housing 20, thus improving the ease of operation for the user upon separating the housings.

The combination of the upper housing 10 and the lower housing 20 by a button operation will be described as a modification. In the above-described embodiment, the hooks 21 are drawn from the lower housing 20 by the magnetic force of the magnets to combine the lower housing 20 with the upper housing 10. According to the modification, a button is pushed to move the hooks 21 upward from the lower housing 20, thus combining the lower housing 20 with the upper housing 10.

Figure 16:
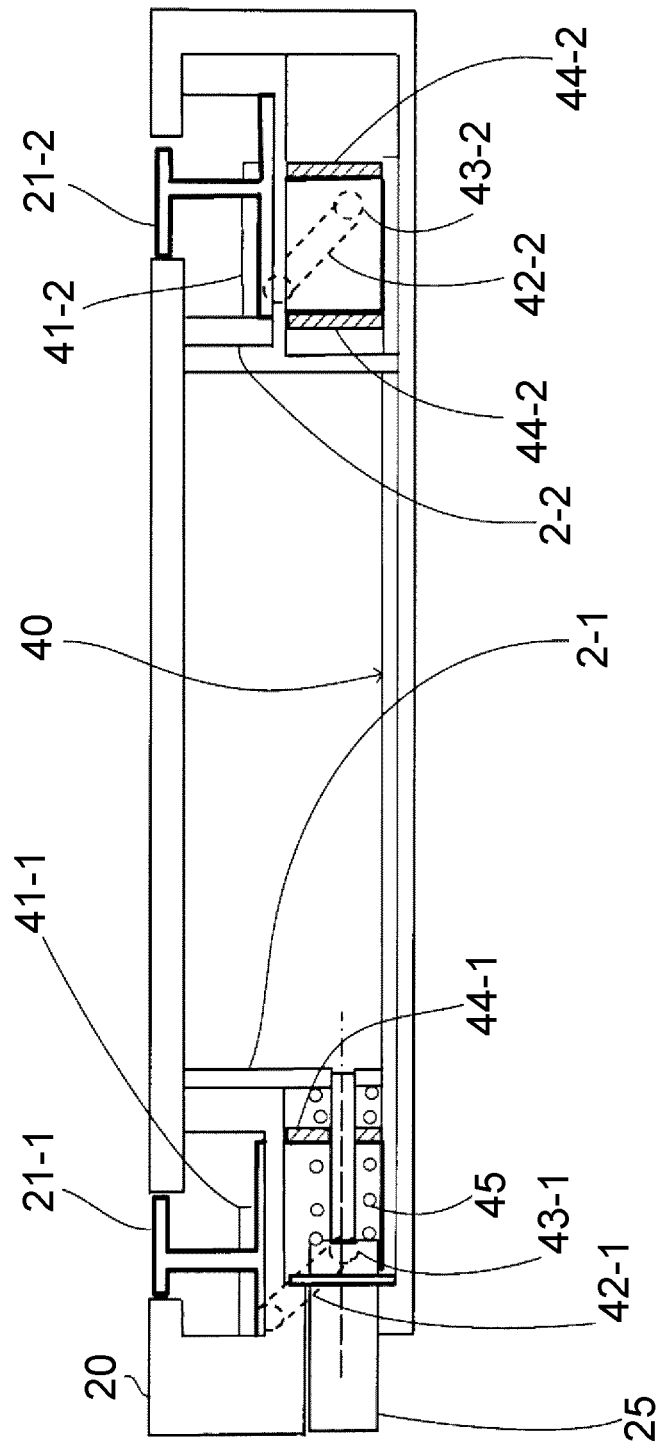
FIG. 16 is a diagram illustrating a button-based hook pushing mechanism.
Figure 17:
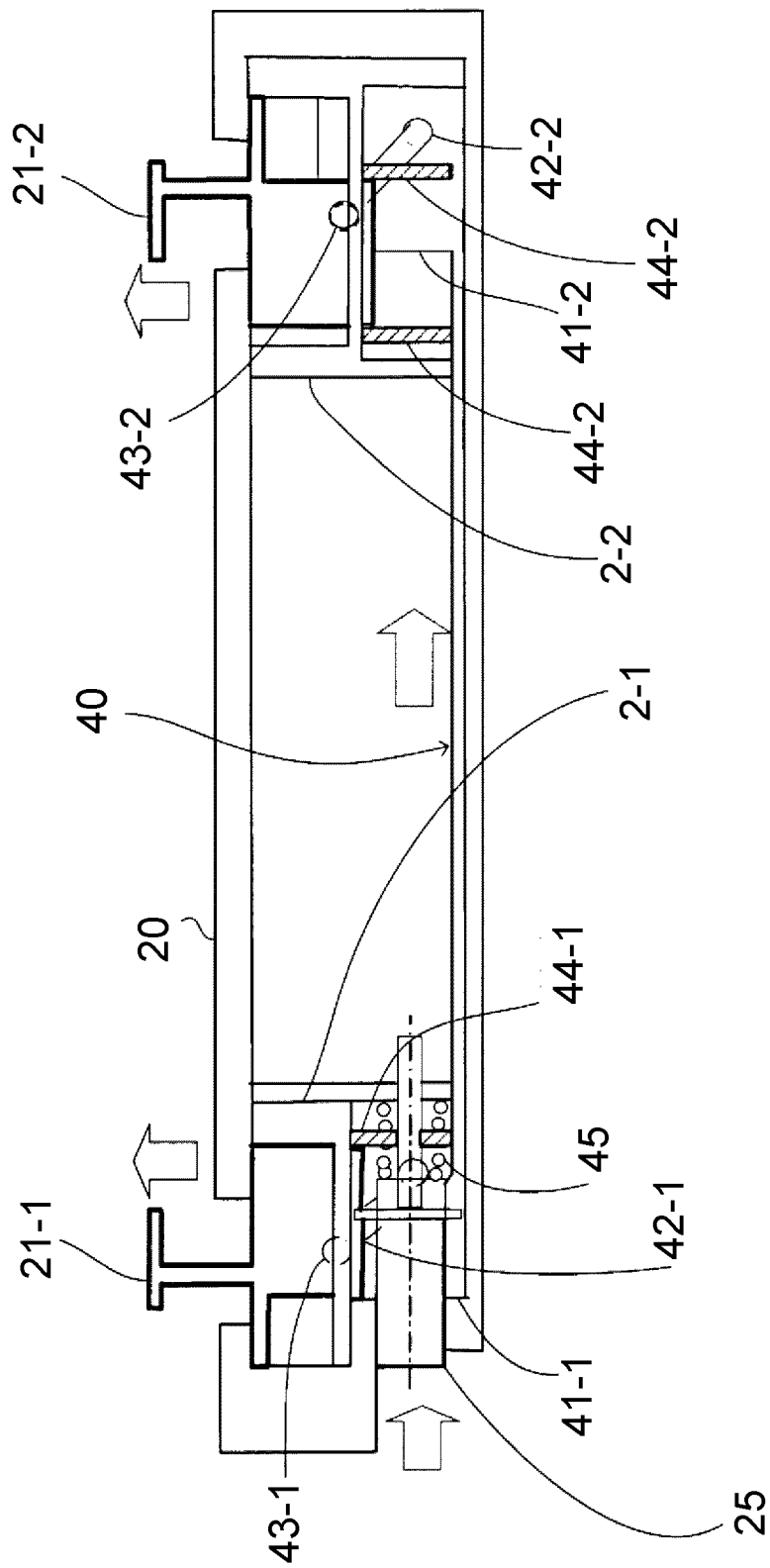
FIG. 17 is a diagram illustrating the button-based hook pushing mechanism.

FIGS. 16 and 17 illustrate a button-based hook pushing mechanism. FIG. 16 illustrates a state where the hooks 21 are received. FIG. 17 illustrates a state where the hooks 21 are pushed by a button operation.

Figure 18:
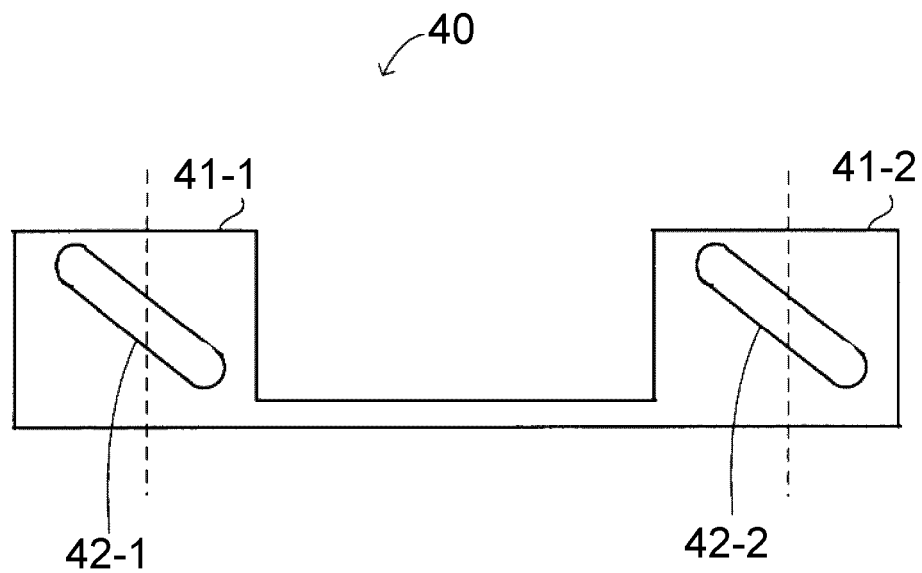
FIG. 18 is a diagram illustrating an exemplary shape of a hook pushing guide.

The lower housing 20 is provided with a single hook-pushing button 25 on one side surface thereof. The hook-pushing button 25 is attached to a hook-pushing guide 40. FIG. 18 illustrates an exemplary shape of the hook-pushing guide 40.

The hook-pushing guide 40 includes two hook-pushing guide plates 41-1 and 41-2 having hook guide grooves 42-1 and 42-2, respectively, and is shaped such that the guide plates are connected to each other. As regards the hook guide grooves 42-1 and 42-2, each guide groove is slanted at an angle relative to a perpendicular line.

Referring again to FIGS. 16 and 17, one end of a hook-pushing pin 43-1 is fitted in the hook guide groove 42-1 and the other end thereof is fixed to the hook 21-1. The lower housing 20 is further provided with a hook guide rib 44-1 that vertically guides the hook 21-1.

Similarly, one end of a hook-pushing pin 43-2 is fitted in the hook guide groove 42-2 and the other end thereof is fixed to the hook 21-2. The lower housing 20 is further provided with a hook guide rib 44-2 that vertically guides the hook 21-2.

While the hook-pushing button 25 is not pushed as illustrated in FIG. 16, the hooks 21-1 and 21-2 are received in the hook storage portions 2-1 and 2-2, respectively. Whereas, when the hook-pushing button 25 is pushed in the direction of an arrow in FIG. 17, the hook-pushing guide 40 is moved left to right, so that the hook guide grooves 42-1 and 42-2 are also moved in the same direction.

The hook pushing pins 43-1 and 43-2 are therefore moved upward while being guided by the slanted grooves, serving as the hook guide grooves 42-1 and 42-2. Consequently, the hooks 21-1 and 21-2 connected to the hook pushing pins 43-1 and 43-2 are pushed upward along the hook guide ribs 44-1 and 44-2, respectively, so that the hooks protrude out of the hook storage portions 2-1 and 2-2, respectively.

When the hook-pushing button 25 is released, the hook-pushing guide 40 is returned to its original position by restoring force of a coil spring 45. Accordingly, so long as the hooks 21-1 and 21-2 are not engaged with the sliding member 12, the hooks 21-1 and 21-2 are received in the hook storage portions 2-1 and 2-2, respectively.

Figure 19:
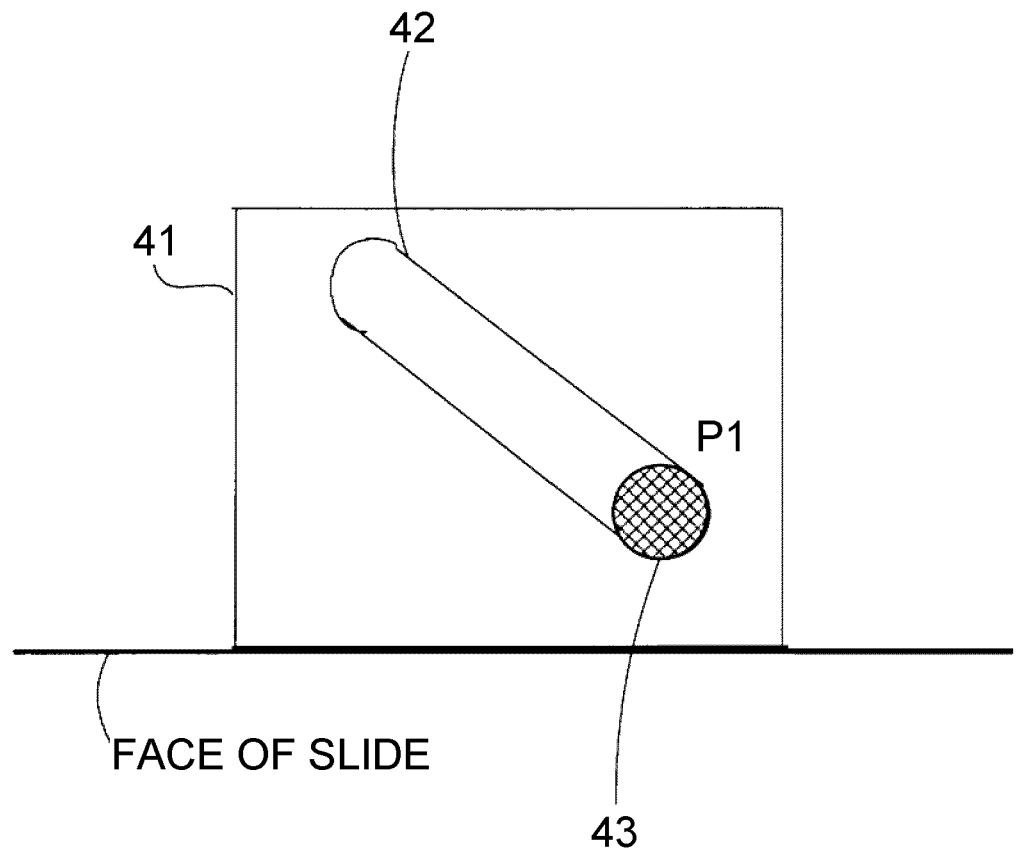
FIG. 19 is a diagram illustrating an action of a hook pushing pin.
Figure 20:
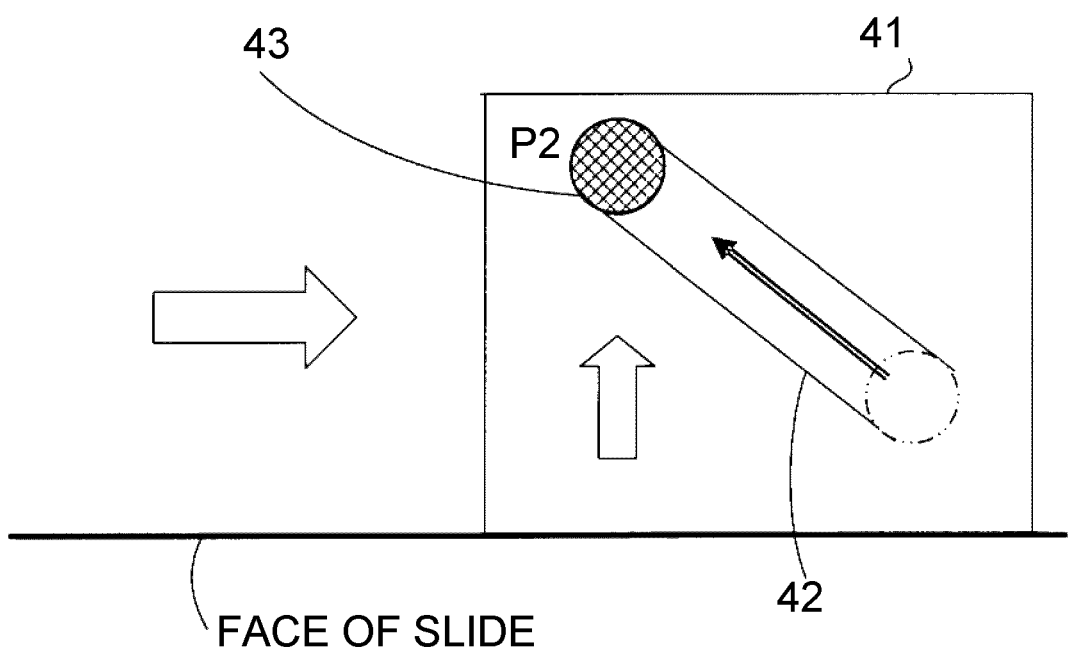
FIG. 20 is a diagram illustrating the action of the hook pushing pin.

FIGS. 19 and 20 are diagrams illustrating actions of the hook-pushing pin 43. When the hook pushing guide plate 41 is slid on a slide surface, the hook-pushing pin 43 is moved from a position P1 to a position P2 along the hook guide groove 42 which guides the vertical movement.

As described above, the lower housing 20 is provided with the hook pushing guide 40 having the guide grooves which allow the hooks to protrude out of the respective hook receiving portions, the hook pushing pins 43 each having one end fitted in the corresponding guide groove and the other end fixed to the corresponding hook, and the hook pushing button 25 connected to the hook pushing guide 40.

When the hook-pushing button 25 is pushed, the hook-pushing guide 40 is slid in the direction in which the button is pushed, the hook pushing pins 43 are moved upward along the respective guide grooves, so that the hooks are pushed out of the respective hook storage portions. When the hook-pushing button 25 is released, the hooks are received into the lower housing 20.

Accordingly, pushing the hook pushing button 25 once during combination of the housings, namely, such a simple operation allows the hooks 21-1 and 21-2 to be drawn, thus increasing the ease of operation for the user.

A modification of the sliding operation for combining the upper housing 10 with the lower housing 20 will now be described. In the foregoing embodiment, to combine the housings, the upper housing 10 is slid downward relative to the lower housing 20 to be combined therewith as illustrated in FIGS. 6 to 8. According to the modification, the sliding operation is reversed such that the upper housing 10 is slid upward relative to the lower housing 20 to be combined therewith.

Figure 21:
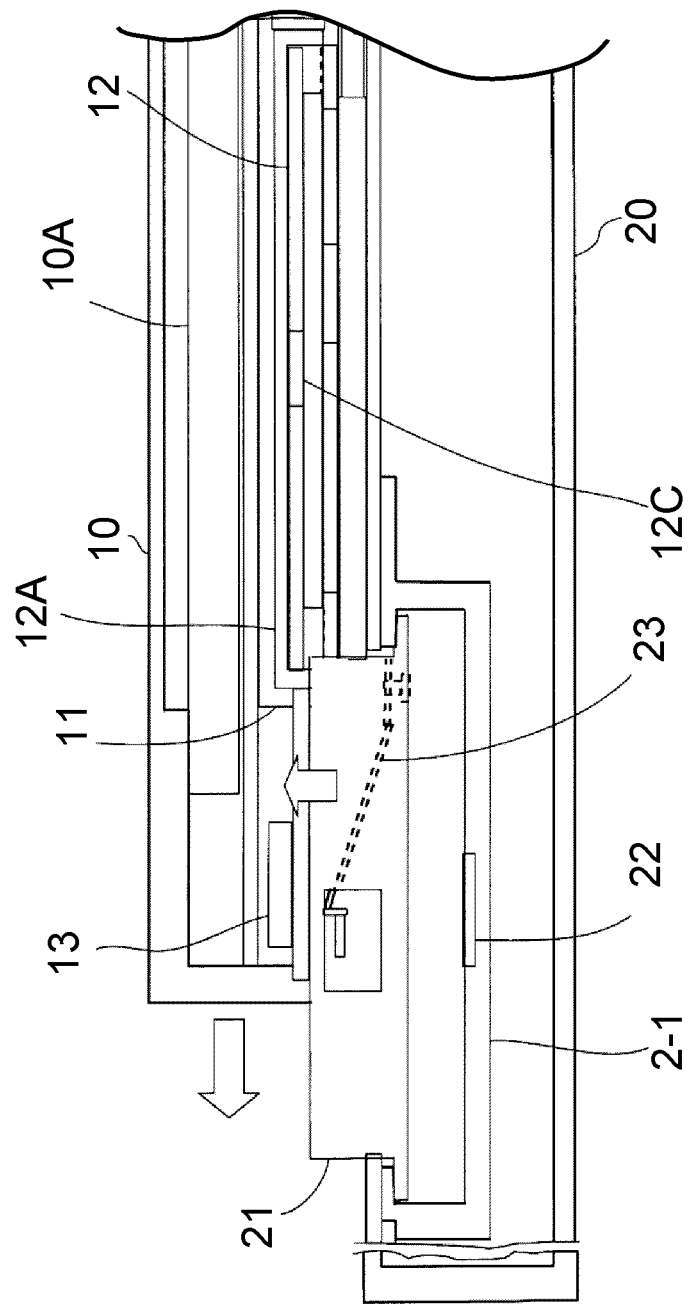
FIG. 21 is a longitudinal sectional view of another communication device.

FIG. 21 is a longitudinal sectional view of a communication device according to the modification. The lower housing 20 includes the hook storage portions 2 which receive the hooks 21, respectively. Each hook storage portion 2 is provided with the hook storage magnet 22 on the bottom surface thereof. The hook 21 is provided with the lock spring 23. The lock spring 23 is disposed so as to have orientation opposite to that in FIG. 10.

The upper housing 10 has a two-layer structure. A first layer receives the display unit 10A. A second layer receives mechanical components for combination and separation of the housings, e.g., the rail 11, the sliding member 12, the slide lubricating members 12A, and the hook attraction magnets 13.

With the arrangement illustrated in FIG. 21, the upper housing 10 is slid in the direction of an arrow relative to the lower housing 20 in order to combine the housings. Such a sliding operation for combination allows the user to easily visually recognize a state where the hooks 21 are drawn from the lower housing 20. Thus, the user may combine the housings while recognizing how the housing is attached to the other one.

As described above, the two separated housings of the communication device 1 constitute a double structure. The device is normally of the slide type in which the display unit is slidable. The communication device 1 is designed such that the housings may be easily separated through the sliding member when the separation button disposed on the upper housing is operated. While the housings are separated from each other, the appearance of the device is smart because there is no protrusion.

On the rear surface of the upper housing opposite the display surface, a slide rail mechanism including the sliding member which slides on the rail while being engaged with the rail is disposed. The hooks are provided for the lower housing. The hooks are drawn by the magnets provided for the upper housing.

The hooks are engaged with the recesses of the sliding member provided for the upper housing. When the upper housing is slid relative to the lower housing in this state, the hooks are completely connected to the sliding member. With this configuration, the housings may be reliably combined with each other by a simple sliding operation, thus improving the ease of operation.

As regards the lock between the hook and the sliding member, the engagement sliding operation is locked by the lock spring provided for the hook. For unlocking in this case, the separation button provided for the side surface of the upper housing is pushed to unlock the lock and the upper housing is slid relative to the lower housing (in the opposite direction from that for combination) while the separation button is being pushed, so that the housings may be separated from each other. With this structure, the housings may be reliably separated from each other by a simple sliding operation, thus improving the ease of operation.

The exemplary embodiment of the present invention has been described above. The components described in the embodiment may be replaced by other components having similar functions. Moreover, another component and/or step may be added. Furthermore, although the mechanism for combination and separation of the housings based on sliding operations in the longitudinal direction of the device has been described above, a similar mechanism is applicable to combination and separation of the housings based on sliding operations in the lateral direction of the device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication device comprising:
   a first housing including a rail and a slider, the rail and the slider being capable of engaging with each other; and
   a second housing including a hook which engages with the slider to combine the first and the second housings with each other when the first housing is slid above the second housing along a first direction, the hook being disengaged with the slider to release the first housing from the second housing according to an operation including a motion in which the first housing is slid above the second housing along a second direction different from the first direction.

2. The communication device according to claim 1, further comprising:
   a hook storage disposed in the second housing and configured to store the hook; and
   a first magnet disposed in the second housing and configured to attract the hook in order to store the hook within the hook storage when the first and the second housing are released from each other.

3. The communication device according to claim 2, further comprising:
   a second magnet having magnetic attraction higher than that of the first magnet, the second magnet being disposed in the first housing, the second magnet being configured to move the hook in an outward direction from the hook storage for combination of the first and the second housings.

4. The communication device according to claim 1, wherein the hook is provided with a lock spring and the slider is provided with a lock groove, and the hook and the lock groove are fixed with each other by engaging the lock spring with the lock groove when the first housing is slid in the first direction.

5. The communication device according to claim 4, wherein the first housing includes a separation button provided with a first and a second protrusions,
   wherein when the separation button is pressed, the first protrusion engages the slider to secure the slider to the first housing and the second protrusion lower the lock spring to disengage lock between the hook and the slider.

6. The communication device according to claim 1, further comprising:
   a hook storage disposed in the second housing and configured to store the hook;
   a guide provided with a guide groove for protruding the hook out of the hook storage;
   a guide pin, an end of the guide pin engaging with the guide groove and the other end of the guide pin being secured to the hook; and
   a hook pushing button connected to the guide, wherein the guide is slid in a direction in which the hook pushing button is pressed, thereby the guide pin moves along the guide groove and the hook is protruded out of the hook storage.

7. A method of combining and releasing housings, comprising:
providing a rail and a slider to a first housing, the slider engaging with the rail;
providing a hook to a second housing;
combining the first housing with the second housing by engaging the hook and the slider according to an operation including a motion in which the first housing is slid above the second housing along a first direction; and
releasing the first housing from the second housing by disengaging the hook and the slider according to an operation including a motion in which the first housing is slid above the second housing along a second direction different from the first direction.

8. The method according to claim 7, wherein
the second housing includes a hook storage and a first magnet for attracting the hook, and the first magnet stores the hook within the hook storage when the first and the second housing are released from each other.

9. The method according to claim 8, wherein
the first housing includes a second magnet having magnetic attraction higher than that of the first magnet and the first magnet moves the hook in a outward direction from the hook storage when the first and the second housings are combined.

10. The method according to claim 7, wherein
wherein the hook is provided with a lock spring and the slider is provided with a lock groove, and the hock and the lock groove are fixed with each other by engaging the lock spring with the lock groove when the first housing is slid in the first direction.

11. The method according to claim 7, wherein
the first housing includes a separation button provided with a first and a second protrusions, and the first protrusion engages the slider to secure the slider to the first housing and the second protrusion lower the lock spring to disengage a lock between the hook and the slider when the separation button is pressed.

12. The method according to claim 7, wherein
the second housing includes,
a hook storage for storing the hook,
a guide provided with a guide groove for protruding the hook out of the hook storage,
a guide pin, an end engaging with the guide groove and the other end being secured to the hook, and
a hook pushing button connected to the guide,
wherein the guide is slid in a direction in which the hook pushing button is pressed, thereby the guide pin moves along the guide groove and the hook is protruded out of the hook storage.

* * * * *